United States Patent
Malone

(10) Patent No.: US 7,359,107 B2
(45) Date of Patent: Apr. 15, 2008

(54) ANALOG MEMS WITH NON-LINEAR SUPPORT

(75) Inventor: Joshua J. Malone, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 40 days.

(21) Appl. No.: 11/278,375

(22) Filed: Mar. 31, 2006

(65) Prior Publication Data

US 2007/0236778 A1    Oct. 11, 2007

(51) Int. Cl.
*G02B 26/00* (2006.01)
*G02B 26/08* (2006.01)
*G02B 1/182* (2006.01)

(52) U.S. Cl. .............. 359/291; 359/290; 359/224; 359/872

(58) Field of Classification Search .......... 359/224, 359/290, 291, 292, 872; 385/18
See application file for complete search history.

(56) References Cited

U.S. PATENT DOCUMENTS

| | | | |
|---|---|---|---|
| 5,661,591 A | * | 8/1997 | Lin et al. ............... 359/290 |
| 5,739,941 A | | 4/1998 | Knipe et al. |
| 6,775,050 B2 | * | 8/2004 | Yoon et al. ............. 359/291 |
| 2006/0082251 A1 | * | 4/2006 | He et al. ................ 310/309 |

OTHER PUBLICATIONS

Victor M. Bright and David M. Burns, "Nonlinear flexures for stable deflection of an electrostatically actuated micromirror," Air Force Institute of Technology, Department of Electrical and Computer Engineering, SPIE vol. 3226, 1997.

* cited by examiner

*Primary Examiner*—David N. Spector
(74) *Attorney, Agent, or Firm*—Wade James Brady, III; Frederick J. Telecky, Jr.

(57) ABSTRACT

The disclosed embodiments reveal an analog MEMS device with a pivotal micromirror that is supported by one or more beams that provide non-linear resistance. An electrode can electrostatically attract the micromirror, while the beam(s) provide resistance to deflection. When the forces equalize, the micromirror is held at a target angle. The beam support disclosed in the embodiments is superior to conventional torsion hinge supports, because it provides non-linear support for the micromirror, better matching the non-linear nature of the electrostatic force.

38 Claims, 4 Drawing Sheets

$$F = k\left(\sqrt{L_1^2 + d^2} - L_1\right)$$
$k = 540\,nN * \mu m$
$L_1 = 12.5\,\mu m$

ANALOG MEMS WITH NON-LINEAR SUPPORT

FIELD OF THE INVENTION

The embodiments described below generally relate to providing non-linear support for micro-electromechanical systems, and more specifically to providing non-linear support for analog micromirrors.

BACKGROUND OF THE INVENTION

Recently, the miniaturization of various mechanical devices has sparked a new field of technical advancement. Such micro-electromechanical systems ("MEMS") integrate mechanical elements with electrical control circuits on a substrate, and are typically manufactured using integrated circuit techniques. Because of their small size, MEMS have become increasingly useful in the development of modern, smart products. Common applications include accelerometers, pressure sensors, actuators, and spatial light modulators.

One type of MEMS device involves micromirrors. Micromirror devices utilize an array of thousands or even millions of tiny, tilting reflective surfaces. These micromirrors can be used to reflect light onto a projection surface, typically forming visual images. Used in this way, micromirrors can function as display units, reproducing high quality visual images of the sort needed in up-scale home entertainment devices. They can also be used in optical switching systems and optical communications systems.

Many conventional micromirrors are used within the framework of digital micromirror device ("DMD") technology. Each of the mirror elements of a DMD may switch between two positions, corresponding to an open or closed light configuration, based on the angle at which the mirror tilts towards the light source. A digital micromirror is in an open position when it is oriented to reflect the light source onto the projection surface. A digital micromirror is in a closed position when it is oriented so that none of the light provided by the light source is projected onto the projection surface. Thus, each digital micromirror can be oriented in either an open or "on" position, or a closed or "off" position, providing a binary or digital response.

By rapidly turning a particular digital micromirror "on" and "off," the appropriate shade of light can be projected for a particular pixel on the projection surface. And color hues may also be added to a DMD projection system by time multiplexing of the white light source through a color wheel. In practice, digital micromirrors alternate between open and closed positions so fast that the human eye cannot discern the discreet "on" and "off" positions of each digital micromirror. Instead, the human eye extrapolates the discreet binary images projected by each mirror element into a wide variety of pixel shades and hues. In this way, DMDs allow for the accurate reproduction of the whole array of necessary shades and hues by taking advantage of the human eye's averaging of quickly varying brightnesses and colors.

Typically, each micromirror in a DMD is oriented in either the open or closed position using electrostatic forces generated by corresponding electrodes. Commonly, each digital micromirror is located atop a hinge mechanism, and an electrode is located on either side of the hinge. These electrodes are typically formed on a semiconductor substrate beneath the micromirrors. Whenever an appropriate voltage is applied to an electrode, it creates an electrostatic force capable of pivoting the micromirror on its hinge. Only one of the two electrodes will be active at any specific moment in time, corresponding to either the open or closed position.

While many micromirrors are conventionally used in the type of DMD systems described above, micromirrors may also be used within analog micromirror devices. Analog micromirror devices operate using principles akin to those of the DMD, but they differ from DMDs because they do not operate by rapidly switching between two positions corresponding to "on" and "off." Instead, the appropriate shade of light is transmitted based on the angle of the micromirror in relation to the light source and the projection surface. By altering the angle of incidence within a wide range of available positions, the intensity of light displayed can be adjusted.

In operation, analog micromirrors utilize the same sort of electrostatic attraction as DMDs. Conventionally, each analog micromirror is typically mounted atop a torsion hinge, biased to restore the micromirror back to its neutral position. Electrodes are located under the micromirror. Instead of switching the micromirror positions rapidly between two positions (by pulling the micromirror against one of two electrode contact surfaces using one of two constant electrostatic forces), however, the analog micromirror applies differing levels of electrostatic force in order to bring the forces on the micromirror into equilibrium. For each level of electrostatic force applied by an electrode, the equilibrium point between the electrostatic force and the torsional spring force of the hinge would settle at a distinct angle. So by changing the amount of electrostatic force applied to a conventional analog micromirror, the micromirror's angle of incidence can be altered. By its non-binary nature, the analog micromirror does not require the same rapid back and forth changes in position as the DMD. Instead, it uses a slower but smoother motion to direct the correct shade of light onto the projection surface.

Analog micromirror display units overcome one of the typical problems facing DMDs—the "stiction" problem. DMDs often suffer stiction due to the contact forces present when the electrode pulls the micromirror into position against the electrode contact surface. Since analog micromirrors do not make contact with any surface, they may provide a means for overcoming stiction problems that can affect the contrast available on micromirror video display equipment. And in addition to their uses for video image projection, micromirrors may also be used as optical switching relays within optical wireless communication systems. While DMDs can serve some functions in these sorts of systems, the analog micromirrors are typically used for these purposes since they can provide a greater range of angles of reflection.

Conventional analog micromirrors face their own problems, however. As described above, analog micromirrors generally rely on a balancing of the electrostatic force and the torsional spring force of the hinge in order to orient the micromirror to the appropriate angle. This sort of balancing approach requires that the spring-like resistance applied on the micromirror by the torsional hinge match the electrostatic force applied via the electrode. But while the torsional spring force increases linearly, gaining strength in proportion to its deflection, the electrostatic force increases non-linearly as a function of the square of the distance between the micromirror and the electrode.

The result of the differing nature of the electrostatic force and the linear spring force of the torsion hinge is a phenomenon known as "snap-through." Once the micromirror has deflected approximately one-third the total separation distance between its neutral position and the electrode, conventional analog micromirrors become unstable as the non-linear electrostatic force rapidly increases beyond the capacity of the linear spring force of the torsion hinge. As the torsion hinge loses the ability to match the electrostatic force, the micromirror can no longer reach an equilibrium position, and instead it suddenly pivots the remaining distance to contact the electrode. Thus, snap-through limits the useful range of motion of a typical analog micromirror device to approximately one-third of the initial separation distance between electrode and micromirror.

Conventional analog micromirrors also have a tendency to degrade over time due to hysteresis. The repeated movement of the micromirror over time influences the responsiveness of the linear torsion spring for a conventional analog micromirror, leading to less precise control of the micromirror. Consequently, overcoming hysteresis would improve the durability of analog micromirror devices.

SUMMARY OF THE INVENTION

The embodiments disclosed below seek to minimize the effects of the snap-through phenomenon that plagues conventional analog micromirrors. By delaying the onset of snap-through, analog micromirrors would gain a larger effective range of deflection; much more of the gap between the electrode and the micromirror would become usable, without the micromirror tending to overshoot the target angle and collapsing into the electrode. Increasing the range of angles available for an analog micromirror would allow it to operate more effectively, reflecting a wider array of shades. This may provide better picture quality when used in video image display systems. Additionally, when used within optical communication systems, the increase in possible micromirror positions may provide greater switching options.

In order to delay the onset of snap-through, the disclosed embodiments replace the conventional linear support mechanism for the micromirror with a non-linear support mechanism. By utilizing a support mechanism that provides non-linear resistance to the electrostatic force, the effective range of motion for the micromirror can be increased.

Ideally, the goal for an analog micromirror is to provide a full range of motion, in which the electrostatic force can be balanced by a corresponding resistive support force. The two opposing forces can be brought into equilibrium by utilizing a resistive support that increases force in proportion to the square of deflection. With such a perfectly non-linear support, the resistance would increase as a function of the square of the deflection of the micromirror from its neutral position. This would match the electrostatic force provided by the electrode, which increases exponentially as the distance between the micromirror and the electrode decreases (which could also be described as an increase in the deflection of the micromirror). Thus, an idealized second-order flexure, which provides increasing restorative force on the micromirror in proportion with the square of deflection distance throughout the entire range of motion, would represent a target benchmark for optimal micromirror support.

Using an ideal second-order flexure to support the micromirror would allow the restorative force (that wants to bring the micromirror back to its neutral position) to effectively match the electrostatic force. This would increase the available range of deflection for the micromirror, allowing it to approach the full range of motion from the neutral position down to the electrode. By increasing the available tilt angles, optical contrast for analog micromirror devices would be improved. Furthermore, such a non-linear support would allow the micromirror to gently assume the correct orientation, slowing to a stop as the forces equalize. This would allow the non-linear support to improve the effectiveness of the analog micromirror by reducing settling fluctuations.

Real-world support solutions are limited physically, however, and can merely approach such a mathematical ideal (of providing second order support throughout the full range of micromirror motion). Instead of eliminating snap-through entirely, real-world embodiments effectively delay the onset of snap-through due to their non-linear support characteristics. Disclosed support structures have a varying force-deflection characteristic that is initially second-order. With deflection, however, the force-deflection characteristics of the disclosed embodiments transition to first-order support. When effectively implemented, the disclosed support structures operate mainly within the regime that is essentially second-order.

So while the real-world embodiments disclosed below typically would not completely eliminate the snap-through phenomenon (since they typically would not provide second-order support throughout the entire possible range of micromirror motion), they can substantially increase the micromirror's range of deflection by delaying the onset of snap-through. By way of example, typical conventional torsion hinge supports allow for the use of only one-third of the total gap between the micromirror and the electrode. The disclosed embodiments increase the usable range of the micromirror to approximately half of the total gap. So by delaying snap-through, the disclosed embodiments offer a substantial upgrade over conventional torsion hinge performance. In actual use, the disclosed embodiments may achieve many of the benefits of an ideal second-order support system by operating primarily over the portion of their range that is substantially second order.

In the disclosed embodiments, the manner of providing non-linear support is to replace the torsional hinge support for the analog micromirror with one or more beams, located away from the neutral pivot-line axis of the micromirror. Such off-axis beams support the micromirror and allow the micromirror to tilt into position in response to the electrostatic force applied by electrodes, while supplying a non-linear restorative force in reaction to the electrostatic force. The beam(s) should be sufficiently thin so that they respond generally like a cable, providing a substantially second-order non-linear response. Describing the beam(s)' response characteristics as "like a cable" refers to the principle that to deflect a cable suspended at its ends, the force of flexure will vary in a non-linear fashion as the cable is pushed from its naturally suspended state. Each thin beam is typically supported by two off-center posts, and is connected to the micromirror at a central position along the length of the beam between the support posts.

In operation, the beam(s) flex up and/or down in response to the pull of the electrostatic force of the electrodes. When an electrode pulls on one side of the analog micromirror, each beam responds in a cable-like fashion as a substantially second-order flexure, by providing a non-linear restorative force in opposition to the electrostatic force. Initially, the beam experiences a bending force; but as the beam deflects in its center, it experiences the force from its connection to the micromirror more and more as axial tension. This change in the way the beam responds to the force of the micromirror (in response to the electrostatic force) increases with deflection of the center of the beam, providing a non-linear second-order flexure support for the micromirror. And since each beam is located away from the neutral pivot axis of the micromirror, linear torsion effects can be minimized.

Using such a non-linear beam support technique, the tilt angle deflection of the micromirror would be limited by the yield strength of the beam(s). If the force exerted by the electrodes exceeds the yield strength of the beam(s), then the beam support would fail and the micromirror would be pulled down into contact with the electrode. So, to maximize the tilt angle deflection range, it may be useful to maximize the effective yield strength of the beam(s).

There are two primary techniques for maximizing the effective yield strength of a disclosed beam support structure: 1) the beam may employ a curved geometry, or 2) the beam may be made of a material that is highly elastic (low modulus). A beam that is curved in a plane normal to the direction of deflection would tend to have sufficient elongation to increase the maximum possible deflection. Likewise, a beam constructed of a highly elastic material would allow greater deflection before failure.

Replacing linear hinge supports with non-linear beam supports can increase the range of tilt angle deflection available for an analog micromirror device. This technique can reduce snap-through as a limiting factor on the optical contrast such analog micromirrors may provide. Furthermore, the use of non-linear beams without linear torsion hinges may in some instances reduce the effect of hysteresis on analog micromirror systems. Because the deformation within a beam support system is primarily bending, rather than torsional twisting, beam support systems tend to exhibit less hysteresis. In this way, the use of non-linear beam supports may provide a more durable analog micromirror with an increased lifespan. Please note, any reference to "non-linear" beams does not refer to beam geometry, but to the beam's force resistance characteristics as a load is applied.

BRIEF DESCRIPTION OF THE DRAWINGS

Reference is made below to the following figures.

DETAILED DESCRIPTION OF THE INVENTION

Figure 1A:
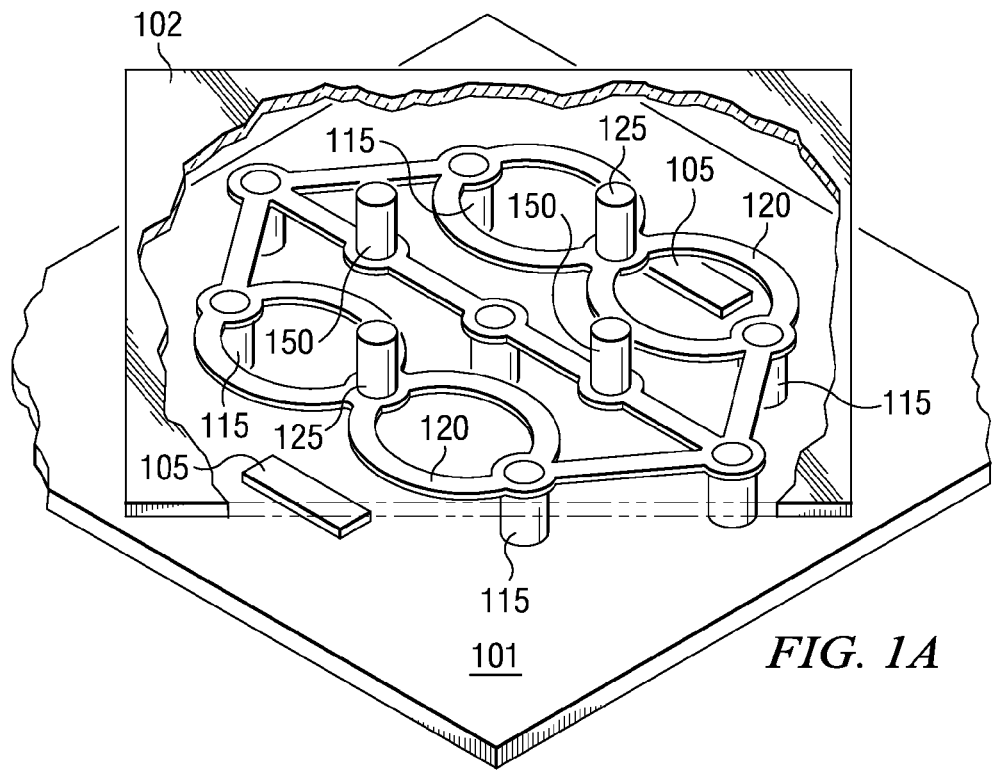
FIG. 1A is a perspective view of an analog micromirror device with non-linear beam support.
Figure 1B:
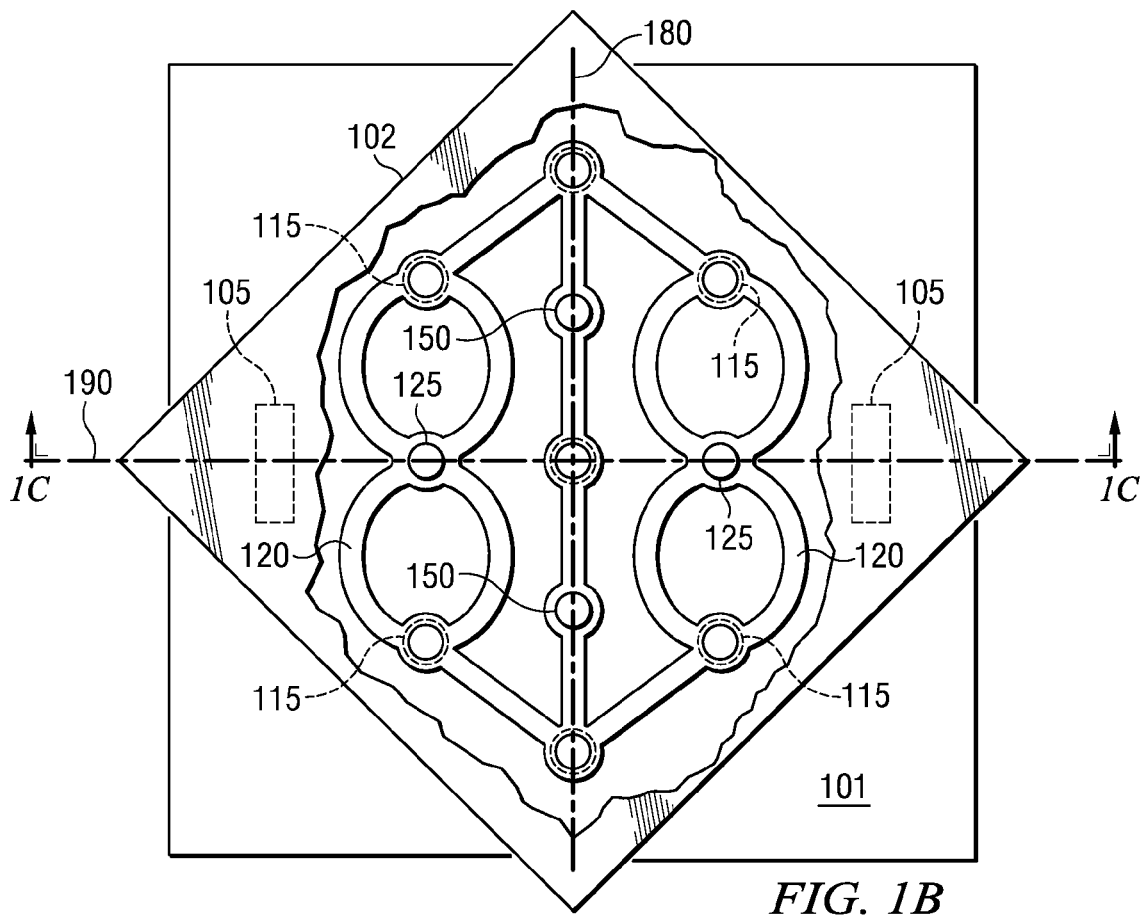
FIG. 1B is a plan view of the embodiment of the analog micromirror device with non-linear beam support shown in FIG. 1A, with a dotted-line depiction of the micromirror, completely cut-away to reveal the lower elements of the binge level.
Figure 1C:
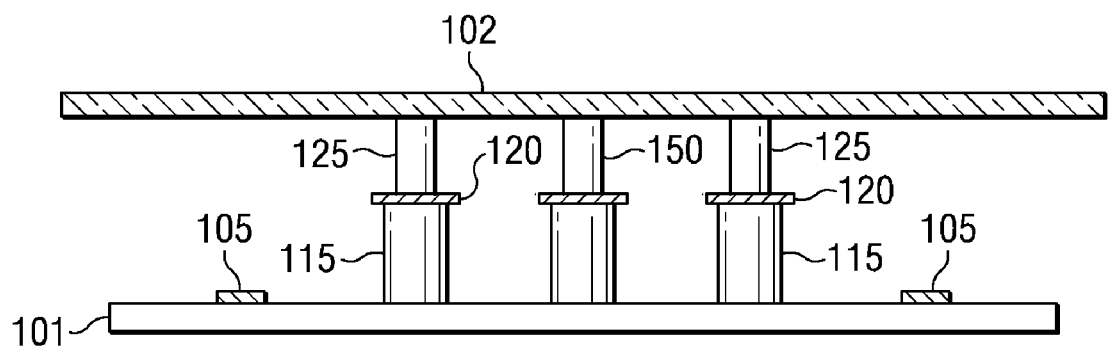
FIG. 1C is a side elevation view of the embodiment of the analog micromirror device shown in FIG. 1A.

FIG. 1A illustrates one of the disclosed embodiments for providing non-linear support for an analog micromirror 102. FIGS. 1B and 1C provide additional views of this embodiment, to aid in illustration. The disclosed embodiment has a substrate 101, serving as its base. Electrodes 105 are formed upon the substrate 101, in order to functionally provide an electrostatic attraction force upon a micromirror 102. A micromirror 102 is supported above the substrate 101 in such a way as to be capable of pivoting about a pivot-line axis 180. In the embodiment shown in FIG. 1A, the micromirror 102 is not supported by a torsional hinge; rather it is supported along its neutral pivot-line axis 180 by two pivot supports 150. And in the embodiment of FIG. 1A, one electrode 105 is located on each side of the pivot-line axis 180 of the micromirror 102, typically in a central location spaced between the pivot supports 150 of the micromirror 102, approximately along the center-line axis 190.

In referring to micromirror 102, any sort of reflective surface is included within the scope of reference. Typically, such micromirrors 102 will reflect visible light, but micromirrors 102 could also be designed to reflect other wavelengths of electromagnetic radiation. Broadly speaking, reference to a micromirror 102 includes any micromechanical surface whose position can be altered in a pivoting motion. And while electrodes 105 are the means of electrostatic attraction discussed in the embodiment of FIG. 1A, it should be understood that any means of electrostatic attraction would function effectively and are therefore included within the scope of the term "electrode."

Between the level of the substrate 101 and/or electrode 105 and the micromirror 102 level lies the beam level The beam level supports the micromirror 102 while serving the resistive-restorative force function typically performed by a hinge in conventional analog micromirror devices. The beam level provides the restorative force on the micromirror 102, tending to return the micromirror 102 back to its neutral, untilted position. It also serves to oppose the electrostatic attraction force of the electrodes 105, such that when the two forces equalize, the micromirror 102 is held stably at a target angle of deflection.

In the embodiment of FIG. 1A, the beam level comprises two off-axis beams 120 (located away from and generally parallel to the pivot-line axis 180 of the micromirror 102). The description of beams 120 as "off-axis" generally refers to the position of the attachment between the micromirror 102 and the beam 120. This point of attachment, and the point of deflection for the beam 120, should be located away from the pivot-line axis 180. The off-axis location of the attachment between the beam 120 and the micromirror 102 minimizes linear torsion effects. In FIG. 1A, each beam 120 is supported above the substrate 101 by support post(s) 115, and the two support posts 115 for each beam 120 are located off-center, equidistantly spaced on each side of the center-line axis 190. At the center of this beam's 120 length (between the support posts 115), the micromirror 102 is attached to the beam 120, so that any pivot action on the part of the micromirror 102 will vertically deflect the beam 120. In the embodiment of FIG. 1A, each beam 120 is attached to the micromirror 102 with a rigid coupling member 125, located in the middle of the length of the beam 120, along the center-line axis 190. To improve the beam level's non-linear resistance efficiency, the beam(s)' 120 point of attachment to the micromirror should typically be located sufficiently far from the pivot-line axis 180 to minimize any linear torsion force upon the micromirror 102.

Such a beam 120 will begin bending as the electrostatic force on the micromirror 102 acts upon the beam 120. As the beam 120 deflects in the middle (sagging or rising depending upon the relationship of the beam 120 to the electrode 101), the bending force will tend towards axial tension. This dynamic effect results in a smooth, continuous substantially second-order non-linear resistive force, in opposition to the electrostatic force.

Figure 6:
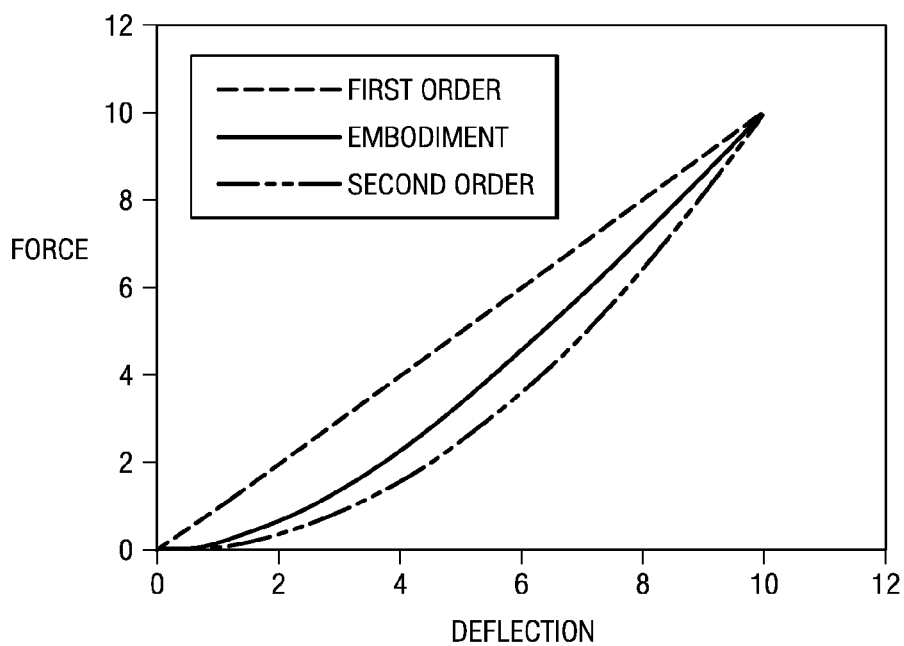
FIG. 6 is a graph showing the force-deflection nature of disclosed beam embodiments in relation to a first order support and an idealized second-order support.

The force-deflection character of such a beam 120 tends to vary based on the level of deflection. Initially, the beam 120 serves as a second-order flexure, but it transitions to act more like a first-order flexure with increasing deflection. FIG. 6 illustrates the force-deflection characteristics of a typical non-linear support beam, showing the manner in which this transition from second-order to first-order support takes place. In operation, the beam 120 is implemented to operate primarily within the range where it serves as a second-order support for the micromirror 102. In this way, the substantially second-order force-deflection character of the beam 120 may effectively counteract the electrostatic force.

The specific shape of the beam(s) 120 can vary, so long as each beam 120 is sufficiently thin so that it behaves generally as a cable loaded vertically at its center, providing non-linear support to the micromirror 102. The attachment between the beam 120 and the micromirror 102 should typically be positioned in a central location along the beam's 120 length, and generally corresponds to the center-line axis 190. By aligning the attachment between the micromirror 102 and the beam 120 with the electrode 105, the forces on the beam 120 can be directed along a single, vertical line, such that the sum force on the beam 120 is primarily a bending force. And while not necessary, typically the beam 120 is symmetrical about the center-line axis 190 in order to provide stability and balance.

The embodiment of FIG. 1A employs a figure-eight beam 120 shape. In the figure-eight shape of the beam(s) 120, two linked circles are supported above the substrate by the support posts 115, and a coupling member 125 links the micromirror 102 to the beam 120 at the beam's 120 midpoint, where the two circles join. Many other beam 120 geometries are possible, so long as they provide the appropriate non-linear response. A typical straight beam shape could function, depending upon the design characteristics of the particular analog micromirror 102 (for example, using a highly elastic material so that the beam 120 would allow sufficient deflection to account for the necessary micromirror tilt angles). Curved beams 120 are often utilized in the disclosed embodiments, however, because the curvature serves to modulate the spring constant. Describing beams 120 as "curved" refers to the use of any substantially 2-D shape other than a straight line. For example, beams 120 could employ an "S" shape, a parabolic "U" shape, an angular "V" or "W" shape, or a sine wave shape. These examples are not all-inclusive, but merely serve to illustrate that a range of geometries are available for the beams 120, and are included within the definition of "curved beams." By employing beams 120 curved in the plane normal to the direction of deflection, the disclosed embodiments allow for sufficient elongation for a significant micromirror 102 tilt. Specific beam 120 geometries may be selected based upon the desired spring constant. Beam 120 geometries will typically depend upon the interplay between yield strength and the maximum deflection provided by the electrode(s).

If the electrostatic force on the micromirror 102 forces the beam 120 to deflect beyond its yield strength, then the beam will lose its elasticity and will cease functioning as an effective restorative force. The goal in designing a support beam 120 is to maximize the amount of deflection available before failure. Material selection factors into yield strength, but the effectiveness of a beam 120 can also be improved by selecting an appropriate beam geometry, providing an adequate spring coefficient. One technique is to create a curved beam 120 with an enlarged length per given area. Packing additional length within the allotted area beneath the micromirror 102 allows the beam 120 to deflect more before failure. Thus, the figure-eight geometry illustrated in FIG. 1A allows greater beam 120 deflection than would a straight beam of similar construction.

In selecting materials for the beam(s) 120, characteristically the beam 120 should flex without breaking or permanently (plastically) deforming. The elastic response of the material provides the restorative force for the micromirror 102. Thus, the modulus of elasticity is important. Typically, metals or alloys would be used for beam 120 construction, given their spring-like qualities. Alternatively, however, the beam 120 could be constructed of a highly elastic material (with a low modulus). By way of example, the beam 120 could essentially be a photolithographic rubber band. Using a highly elastic material would allow for the use of a less curved beam 120, or even a straight beam 120, because the increase in elasticity would provide the necessary deflection for target micromirror 102 tilt angles without failure.

And while the beam 120 design could be used in conjunction with a torsion hinge of the sort typically used in conventional DMDs, disclosed embodiments provide the possibility of eliminating the torsion hinge entirely. The disclosed embodiments focus on developing non-linear support for the micromirror 102, and thus attempt to reduce linear/torsional inputs. The non-linearity of the beam 120 offers more precise matching of the electrostatic force.

In operation, voltage is applied to the micromirror 102 and to one electrode 105 of the embodiment of FIG. 1A. The resulting electrostatic attraction causes the micromirror 102 to tilt towards the energized electrode 105. As the micromirror 102 tilts, one of the beams 120 in FIG. 1A deflects downward at its center, while the other beam 120 deflects upward at its center. Together, these beams 120 resist the electrostatic force of the electrode 105 on the micromirror 102. As the beams 120 flex, the bending force applied to their centers translates more and more to axial tension, providing a substantially second-order non-linear resistance response. This allows the micromirror 120 to smoothly settle into the appropriate angle position where the two forces equalize, balancing to hold the micromirror 102 steady without the need for a contact support.

When the electrode 105 is deactivated (so that there is no voltage producing an electrostatic attractive force), the beams 120 act to restore the micromirror 102 to its neutral position. In practice, however, the micromirror 102 may not release back to neutral before re-orienting to its next position. Instead, the voltage on the electrode 105 could be altered to the appropriate level for the next target angle, and the micromirror 102 would smoothly settle into its proper orientation as the beam(s) 120 provide the appropriate counteracting resistance force. Thus, the interplay between the non-linear electrostatic force of the electrode 105 and the non-linear flexure force of the beam(s) 120 allows for effective balancing of forces, equalizing opposing forces to position the micromirror 102 into a wide range of target angle positions.

Figure 2:
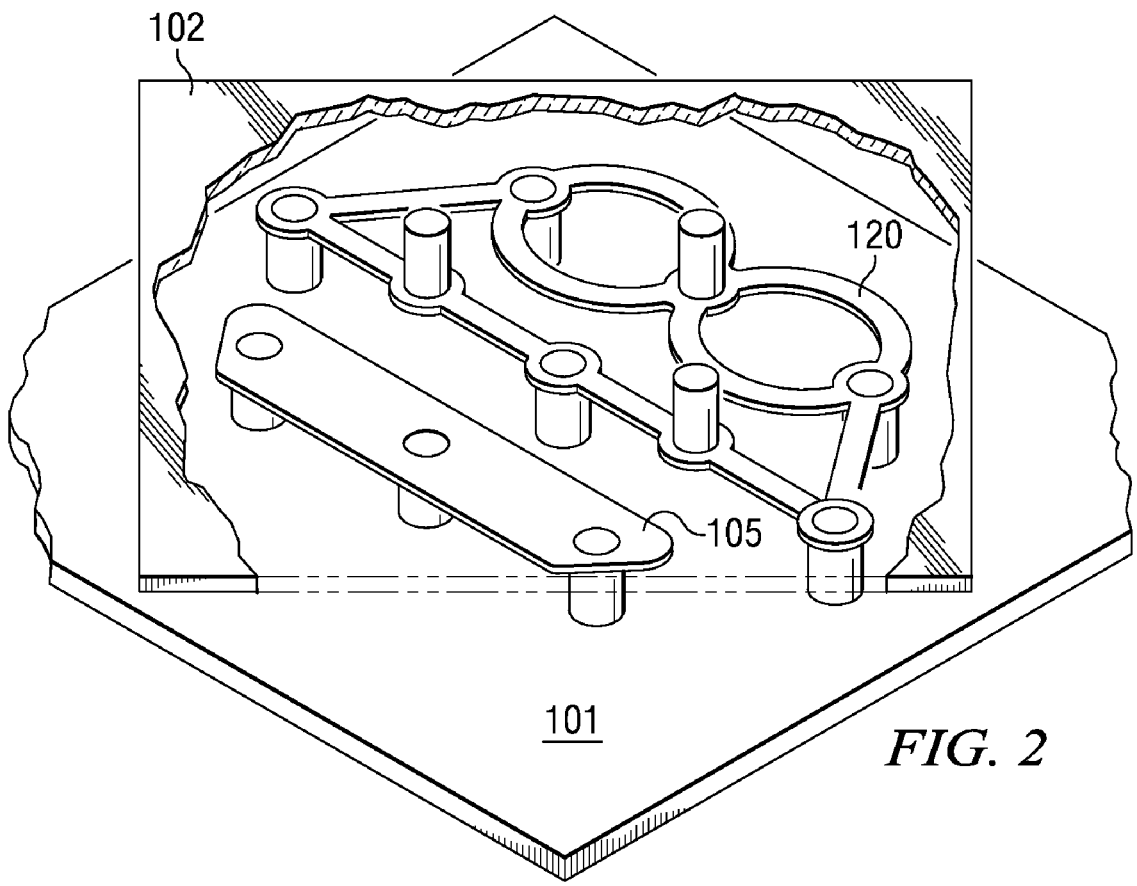
FIG. 2 is a perspective view of an alternative embodiment of an analog micromirror device, with only one non-linear beam support and with an elevated electrode.

The embodiment of FIG. 1A could be used in either analog or digital mode. In such a simulated digital mode, it would simply switch between two set positions (rather than switching micromirror 102 angle orientation between a range of positions), corresponding to "on" and "off." FIG. 2 illustrates another disclosed embodiment, of the type more often used for analog applications. Often, when micromirrors 102 are used in analog mode, they only need to tilt to one side. The embodiment of FIG. 2 illustrates such an analog micromirror 102 setup, in which the micromirror 102 pivots only to one side. In this embodiment, one of the beams 120 and one of the electrodes 105 may be removed. In FIG. 2, the beam 120 and the electrode 105 are located on opposite sides of the pivot-line axis 180. By removing the beam level on the side of the electrode 105, the electrode 105 may be raised. On FIG. 2, the electrode 105 is located approximately the same distance below the micromirror 102 as the beam 120. The force of electrostatic attraction changes as the square of separation distance, so raising the electrode 105 allows for lower voltages to be used to generate the electrostatic force for tilting the micromirror 102. Lower operating voltages may allow for a reduction in the size and corresponding expense of the electrical components used to activate the analog micromirror pixel. Additional electrodes could also be used in the embodiment shown in FIG. 2, with for example a second electrode mounted directly to the substrate 101 on the side of the elevated electrode 105 away from the pivot-line axis 180. In such a configuration, the electrodes would work together to jointly orient the micromirror 102 using electrostatic force.

Figure 3:
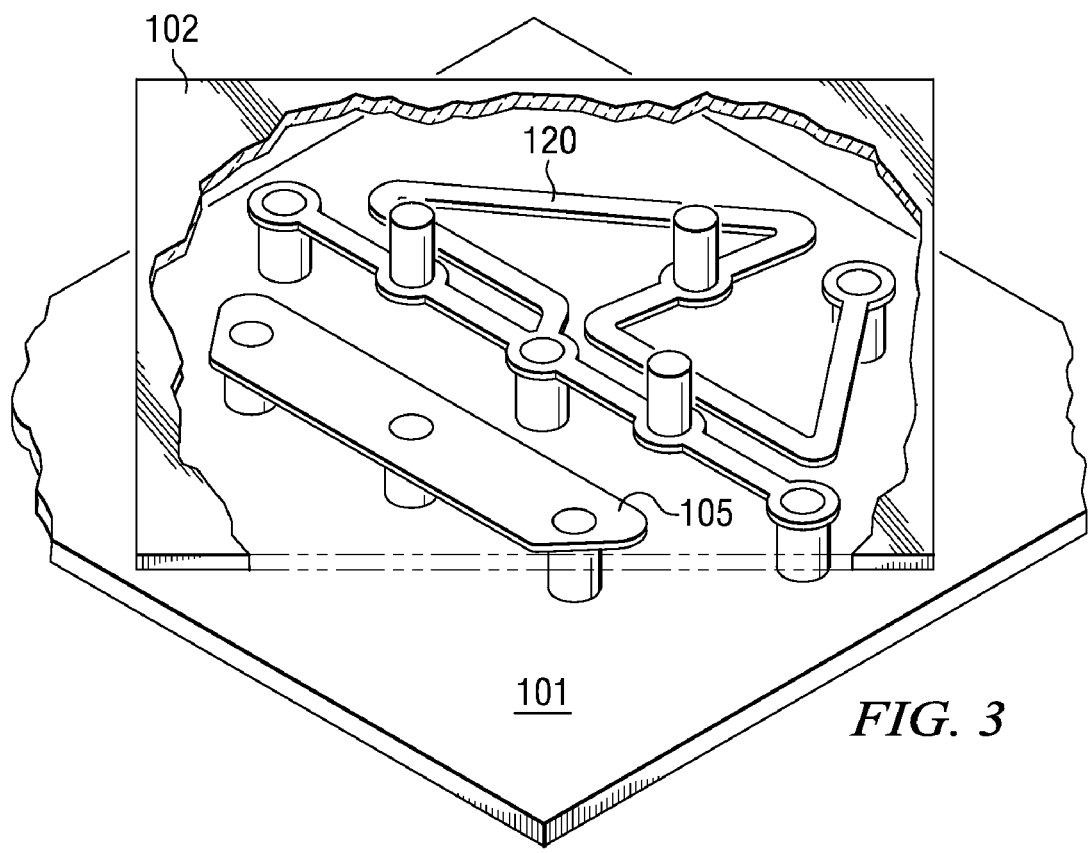
FIG. 3 is a perspective view of an alternative embodiment of an analog micromirror device, showing an alternative geometry for the binge level.

FIG. 3 shows yet another embodiment. This embodiment is similar to that of FIG. 2, having one raised electrode 105 and one beam 120, but it employs a different geometry for the beam 120. The beam 120 of FIG. 3 is supported above the substrate 101 by resting atop a support post 115 on one side and contacting a pivot support 150 on the other side (that corresponds with the second support post 115). The beam 120 has an increased length, employing a symmetrical shape that approximates two linked triangles. This geometry provides a smaller spring coefficient than that of FIG. 2, allowing for larger tilt angles for a given voltage.

Beam geometries can vary greatly, so long as the beam 120 is sufficiently thin and supported to act like a non-linear cable and the point of attachment between the beam 120 and the micromirror 102 is located off-axis. While several discrete geometries have been discussed above, it should be understood that many other geometries which meet the stated criteria exist, and would also function effectively. A person skilled in the art field will readily appreciate alternative designs, which are included within the scope of the invention. It should also be understood that any reference to beams 120 as "non-linear" generally refers not to their geometries, but rather to the beams' 120 resistance characteristics under load, since both curved beams and straight beams may provide non-linear support.

As a further modification to the embodiments set forth above, the distance between the micromirror 102 and the binge level 120 can be reduced. Such a reduction in the height of the coupling member 125 results in less translation of the micromirror 102 upon deflection. Reducing micromirror 102 translation allows for smaller gaps between multiple micromirrors, improving contrast, for example, when an array of analog micromirrors is used to reproduce an optical image.

And it may be beneficial to take steps to minimize torsion effects at the pivot-line axis 180, in order to maintain effective non-linear micromirror 102 support. Thus, it may be useful to employ pivot supports 150 that essentially allow free pivoting of the micromirror 102 about the pivot-line axis 180. By way of example, rounded pivot supports 150 would effectively support the micromirror 102 so that it could pivot appropriately, without introducing the sort of torsional force that could interfere with the non-linear nature of the beam 120 support. Alternatively, pivot supports 150 could be entirely eliminated, so that micromirror 102 position would depend entirely upon the interplay of the two beams 120.

Figure 4:
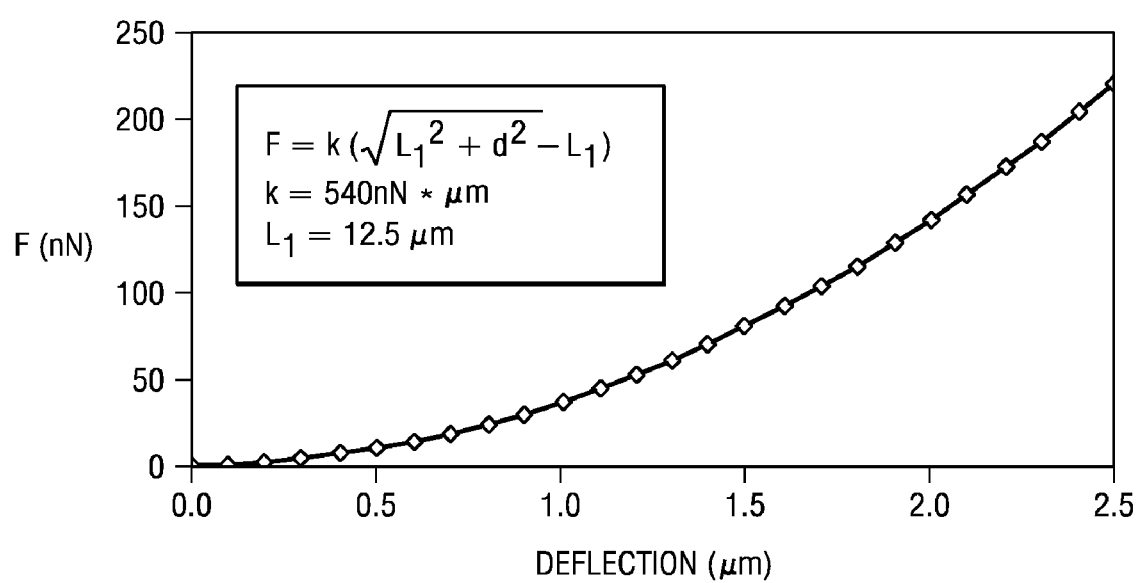
FIG. 4 is a graph showing the non-linearity of force versus deflection for a thin beam.

The non-linear support provided by the beam(s) 120 of the disclosed embodiments provides a smooth, continuous non-linear resistance, that can effectively counteract the non-linear electrostatic force. The resistance force provided by the thin flexible beam 120 is proportional to the size of the deflection angle (by the square of the micromirror's 102 deflection distance), with the spring constant increasing from zero to the tensile stiffness of the beam 120 as the deflection angle approaches ninety degrees. FIG. 4 illustrates the smooth, continuous non-linear nature of beam resistance force as a function of deflection, effectively displaying the second-order resistance characteristics of the beam 120. As the beam 120 deflects, the load becomes more axially supported, resulting in increased stiffness. The beam's 120 force-deflection character, as shown in FIG. 4, relates the deflection of the beam to the force of resistance against deflection. So the force of resistance to deflection increases with the beam's 120 increasing deflection distance. It is this force-deflection character of the beam 120 that applies a resistive/restorative force upon the micromirror 102 in opposition to the electrostatic force. FIG. 6 provides additional detail regarding the substantially second-order nature of the disclosed beams' 120 force-deflection curve.

Figure 5:
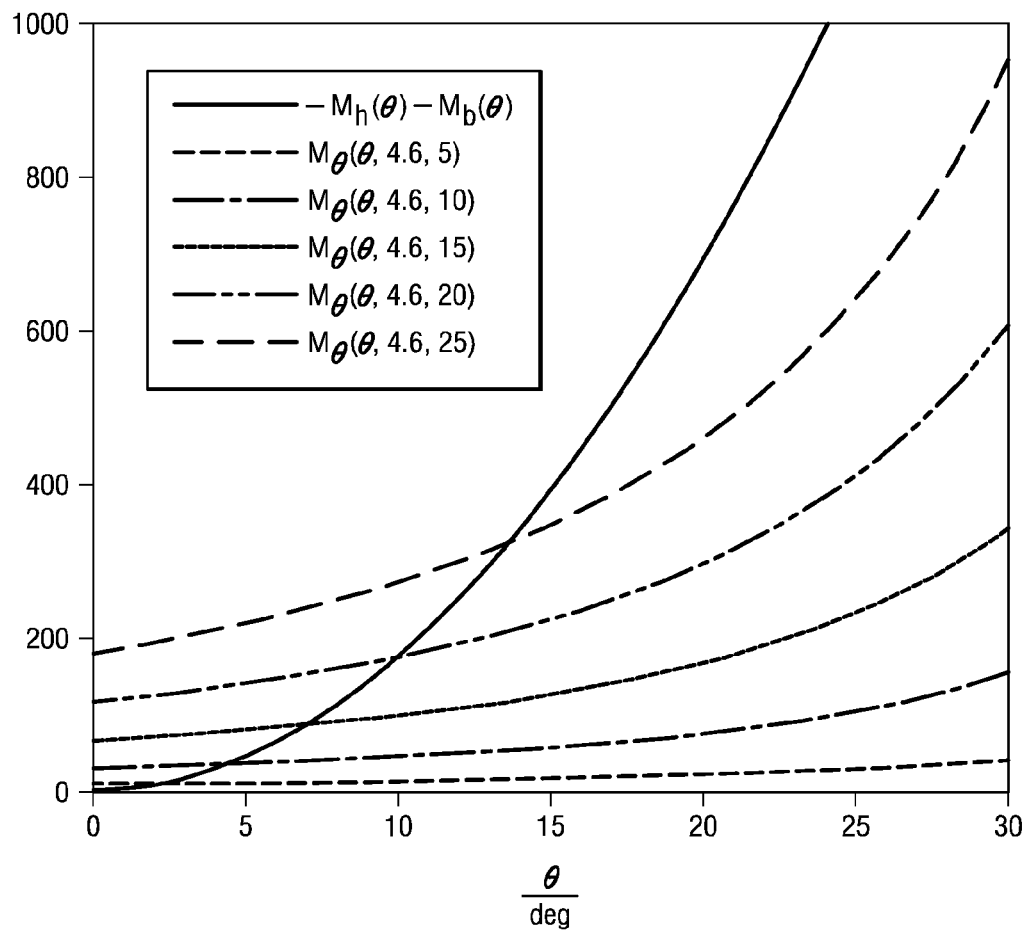
FIG. 5 is a graph showing the non-linearity of the moment versus tilt angle for various applied voltages.

FIG. 5 provides additional evidence of the smooth, continuous non-linear opposition force provided by the beam(s) 120, mapping the manner in which forces can be balanced at varying tilt angles by modulating the applied voltage (manufacturing tolerances and hinge/beam construction will determine actual tilt angle resolution). This smooth, continuous non-linear resistance is an important feature of the disclosed embodiments, since it allows the beams 120 to effectively counteract the non-linear force generated electrostatically. Linear approximations cannot adequately match the support provided by the non-linear beams 120 of the embodiments. Thus, the onset of snap-through (which limits the range of available tilt angles for the micromirror 102) may be greatly delayed by the disclosed beams 120. It is the smooth, continuous curve provided by non-linear supports such as beams 120 that allows for precise control and the effective attainment of equilibrium for analog micromirrors, as the beam(s) 120 provide substantially second order non-linear support for the micromirror 102 in opposition to the non-linear electrostatic force applied to the micromirror 102 by the electrode 105.

And beneficially, the use of beam 120 supports may also reduce hysteresis, providing a more durable analog micromirror 102 device. Since the beams 120 experience primarily bending rather than twisting forces, hysteresis seems to be reduced. Thus, the non-linear support beams 120 discussed above may offer an improved functional lifespan for analog micromirror devices.

While various embodiments in accordance with the principles disclosed herein have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages. It should also be noted that drawings of the disclosed embodiments presented in the included figures are illustrative only, such that they may not be shown to scale, and various elements may actually be larger or smaller than they appear proportionately in the drawings.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Field of the Invention," such claims should not be limited by the language chosen under this heading to describe the so-called technical field. Further, a description of a technology in the "Background of the Invention" section is not to be construed as an admission that technology is prior art to any invention(s) in this disclosure. Neither is the "Summary of the Invention" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What I claim is:

1. A MEMS device comprising:
   a substrate;
   a micromirror pivotally mounted to and above the substrate, the micromirror having a pivot-line axis defined by the pivotal mounting;
   an electrostatic actuator in electrical communication with the micromirror in such a way as to allow for electrostatically pivoting the micromirror substantially about the pivot-line axis; and
   a flexible beam supported above the substrate, the beam being mechanically coupled to the micromirror away from the micromirror's pivot-line axis, whereby the beam's force-deflection character interacts mechanically with the coupled micromirror;
   wherein the beam provides continuous substantially non-linear support for the micromirror.

2. A MEMS device as in claim 1, further comprising two support posts, wherein the beam is supported above the substrate by the two support posts.

3. A MEMS device as in claim 2, wherein the beam is coupled to the micromirror at a point between the two support posts.

4. A MEMS device as in claim 3, wherein the beam is coupled to the micromirror approximately midway between the support posts.

5. A MEMS device as in claim 4, wherein the electrostatic actuator comprises an electrode located along the micromirror's center-line, and wherein the beam is coupled to the micromirror at a point along the micromirror's center-line.

6. A MEMS device as in claim 5, wherein the beam is symmetrical about the micromirror's center-line.

7. A MEMS device as in claim 3, further comprising two pivot support posts mounted to the substrate, the pivot support posts located along the micromirror's pivot-line axis and supporting the micromirror pivotally above the substrate.

8. A MEMS device as in claim 1, wherein the beam has a curved shape.

9. A MEMS device as in claim 1, wherein the beam provides continuous substantially second-order non-linear support for the micromirror.

10. A MEMS device as in claim 9, further comprising two support posts mounted to the substrate, wherein the beam is supported above the substrate by the two support posts.

11. A MEMS device as in claim 10, wherein the beam is coupled to the micromirror at a point between the two support posts.

12. A MEMS device as in claim 11, wherein the electrostatic actuator comprises an electrode located on the opposite side of the micromirror's pivot-line axis from the beam, and wherein the electrode and the beam are spaced approximately the same vertical distance away from the micromirror.

13. A MEMS device as in claim 11, further comprising a second beam supported above the substrate, located symmetrically on the opposite side of the micromirror's pivot-line axis from the first beam, and coupled to the micromirror away from the micromirror's pivot-line axis.

14. A MEMS device as in claim 11, wherein the beam is coupled to the micromirror midway between the support posts.

15. A MEMS device as in claim 14, wherein the electrostatic actuator comprises an electrode located along the micromirror's center-line, and wherein the beam is coupled to the micromirror at appoint along the micromirror's center-line.

16. A MEMS device as in claim 15, wherein the beam is symmetrical about the micromirror's center-line.

17. A MEMS device as in claim 16, wherein the beam is comprised of a material that is sufficiently elastic to allow adequate micromirror deflection without plastic failure.

18. A MEMS device as in claim 16, wherein the beam has a curved shape.

19. A MEMS device as in claim 16, wherein the beam has a figure-eight shape.

20. A MEMS device comprising:
    a substrate;
    a micromirror pivotally mounted to and above the substrate, the micromirror having a pivot-line axis defined by the pivotal mounting;
    an electrode in electrical communication with the micromirror in such a way as to allow for electrostatically pivoting the micromirror substantially about the pivot-line axis; and
    a flexible beam supported above the substrate and beneath the micromirror, mechanically coupled to the micromirror away from the micromirror's pivot-line axis, whereby the beam's substantially non-linear force-deflection character interacts mechanically with the coupled micromirror;
    wherein the beam's substantially non-linear force-deflection character provides continuous substantially second-order flexure support for the micromirror throughout the micromirror's target range of deflection.

21. A MEMS device as in claim 20, wherein the beam has first and second portions that are not parallel to or collinear with one another.

22. A MEMS device as in claim 20, wherein the beam is comprised of a material that is sufficient elastic to allow adequate micromirror deflection without plastic failure.

23. A MEMS device as in claim 20, further comprising a rigid coupling member and two support posts, wherein the two support posts are mounted to the substrate and support the beam above the substrate, and wherein the rigid coupling member couples the beam to the micromirror at a point between the two support posts.

24. A MEMS device as in claim 23, wherein the rigid coupling member is located sufficiently far away from the micromirror's pivot-line axis to minimize torsional effects.

25. A MEMS device as in claim 24, wherein the beam has a curved shape.

26. A MEMS device as in claim 24, wherein the beam is coupled to the micromirror at the midpoint of the beam's length.

27. A MEMS device as in claim 26, wherein the electrode is located along the micromirror's center-line, and wherein the beam is coupled to the micromirror at a point along the micromirror's center-line.

28. A MEMS device as in claim 27, wherein the beam is symmetrical about the micromirror's center-line.

29. A MEMS device comprising:
  a substrate;
  a micromirror pivotally mounted to and above the substrate, the micromirror having a pivot-line axis defined by the pivotal mounting;
  an electrostatic actuator in electrical communication with the micromirror in such a way as to allow for electrostatically pivoting the micromirror substantially about the pivot-line axis; and
  a flexible beam supported above the substrate, the beam being mechanically coupled to the micromirror away from the micromirror's pivot-line axis so that axial tension is exerted on the beam as the micromirror is electrostatically pivoted about the pivot-line axis.

30. A MEMS device as in claim 29, further comprising two support posts, wherein the beam is supported above the substrate by the two support posts.

31. A MEMS device as in claim 30, wherein the beam is coupled to the micromirror at a point between the two support posts.

32. A MEMS device as in claim 31, wherein the beam is coupled to the micromirror approximately midway between the support posts.

33. A MEMS device as in claim 32, wherein the electrostatic actuator comprises an electrode located along the micromirror's center-line, and wherein the beam is coupled to the micromirror at a point along the micromirror's center-line.

34. A MEMS device as in claim 33, wherein the beam is symmetrical about the micromirror's center-line.

35. A MEMS device as in claim 31, further comprising two pivot support posts mounted to the substrate, the pivot support posts located along the micromirror's pivot-line axis and supporting the micromirror pivotally above the substrate.

36. A MEMS device as in claim 29, wherein the beam has a curved shape.

37. A MEMS device as in claim 29, wherein the beam is comprised of a material that is sufficiently elastic to allow adequate micromirror deflection without plastic failure.

38. A MEMS device as in claim 29, wherein the beam has a figure-eight shape.

* * * * *